US008200809B2

(12) United States Patent
Sheppard (10) Patent No.: US 8,200,809 B2
(45) Date of Patent: Jun. 12, 2012

(54) TRAFFIC ANALYSIS FOR A LAWFUL INTERCEPTION SYSTEM (75) Inventor: Scott Sheppard, Decatur, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 616 days.

(21) Appl. No.: 12/062,193

(22) Filed: Apr. 3, 2008

(65) Prior Publication Data
US 2009/0254650 A1 Oct. 8, 2009

(51) Int. Cl.
G06F 15/173 (2006.01)
G06F 17/00 (2006.01)
H04L 29/06 (2006.01)

(52) U.S. Cl. .......... 709/224; 726/1

(58) Field of Classification Search .......... 709/204, 709/220–229, 246; 370/270, 351–358, 392, 370/235; 455/466, 450; 705/1–5
See application file for complete search history.

(56) References Cited

U.S. PATENT DOCUMENTS

| | | | |
|---|---|---|---|
| 5,923,744 A | 7/1999 | Cheng | |
| 6,463,474 B1 | 10/2002 | Fuh et al. | |
| 7,302,702 B2 | 11/2007 | Hippelainen | |
| 7,307,999 B1 | 12/2007 | Donaghey | |
| 7,310,331 B2 | 12/2007 | Sjoblom | |
| 7,324,499 B1 | 1/2008 | Borella et al. | |
| 7,483,379 B2 | 1/2009 | Kan et al. | |
| 7,606,160 B2 | 10/2009 | Klinker et al. | |
| 7,657,011 B1* | 2/2010 | Zielinski et al. | 379/93.02 |
| 7,730,521 B1* | 6/2010 | Thesayi et al. | 726/4 |
| 7,764,768 B2 | 7/2010 | Davis et al. | |
| 7,809,827 B1 | 10/2010 | Apte et al. | |
| 2002/0065938 A1 | 5/2002 | Jungck et al. | |
| 2003/0133443 A1 | 7/2003 | Klinker et al. | |
| 2006/0288032 A1 | 12/2006 | Harris et al. | |
| 2007/0081471 A1 | 4/2007 | Talley et al. | |
| 2007/0292079 A1 | 12/2007 | Jones | |

(Continued)

FOREIGN PATENT DOCUMENTS
WO  WO 2008/040583   *  7/2007

OTHER PUBLICATIONS

U.S. Official Action dated Nov. 20, 2009 in U.S. Appl. No. 12/062,208.

(Continued)

Primary Examiner — Joseph Avellino
Assistant Examiner — Mark O Afolabi
(74) Attorney, Agent, or Firm — Hope Baldauff Hartman, LLC (57) ABSTRACT Methods, systems, and computer-readable media provide for analyzing data traffic captured by a lawful interception system. A first record, one or more intermediate records, and a second record are received. Each of the records contains a record of test traffic, such as a website, transmitted across a broadband network. The first record, the one or more intermediate records, and the second record are reassembled to form various versions of the website. The various versions of the website are displayed so that a visual comparison can be made to verify the operation of the lawful interception system.

16 Claims, 6 Drawing Sheets

U.S. PATENT DOCUMENTS

| | | |
|---|---|---|
| 2008/0095148 A1 | 4/2008 | Hegde |
| 2008/0127335 A1* | 5/2008 | Khan et al. .................. 726/22 |
| 2008/0232269 A1 | 9/2008 | Tatman et al. |
| 2008/0276294 A1* | 11/2008 | Brady .................. 726/1 |
| 2008/0317019 A1* | 12/2008 | Popoviciu et al. ............ 370/389 |
| 2008/0318556 A1* | 12/2008 | Erol et al. .................. 455/414.1 |
| 2009/0007263 A1* | 1/2009 | Frenkel et al. .................. 726/22 |
| 2009/0019220 A1 | 1/2009 | Davis |
| 2009/0041011 A1 | 2/2009 | Sheppard |
| 2009/0100040 A1 | 4/2009 | Sheppard et al. |
| 2009/0254651 A1 | 10/2009 | Sheppard |

OTHER PUBLICATIONS

U.S. Official Action dated May 27, 2010 in U.S. Appl. No. 12/062,206.

U.S. Notice of Allowance dated Apr. 13, 2011 in U.S. Appl. No. 12/092,206.

U.S. Official Action dated Mar. 14, 2011 in U.S. Appl. No. 12/062,226.

U.S. Official Action dated Nov. 23, 2010 in U.S. Appl. No. 12/062,206.

* cited by examiner

TRAFFIC ANALYSIS FOR A LAWFUL INTERCEPTION SYSTEM

BACKGROUND

This invention relates to interception of traffic, in particular lawful interception of broadband traffic.

Lawful interception (e.g., wiretapping) is a common technique used by law enforcement agencies ("LEAs") to intercept certain communications between parties of interest. Unlike illegal interception, lawful interception is performed in accordance with applicable (e.g., local, state and/or federal) laws. In particular, the communications that are intercepted under lawful interception may be subject to the limitations of due process and other legal considerations (e.g., Fourth Amendment). To further protect the parties of interest, intercepted communications may be authenticated to validate any claims in favor of or against the evidence (e.g., that the intercepted communication originated from a particular party, that the communication was intercepted at a particular time, etc.).

Lawful interception is usually accomplished with the help and cooperation of a service provider. The duty of the service provider to provide LEAs with access to otherwise private communications is governed by the Communications Assistance for Law Enforcement Act ("CALEA"). As first passed by Congress in 1994, CALEA was primarily concerned with voice communications, such as plain old telephone service ("POTS") and, more recently, voice over Internet protocol ("VOIP"). However, with the growth of the Internet, LEAs have also sought to intercept data communications transmitted over broadband networks. To this end, CALEA was recently expanded to cover data communications in addition to the traditional voice communications.

Lawful interception of voice communications is generally well known. However, conventional techniques for intercepting voice communications may not be applicable to data communications due, at least in part, to the nature of data communications and its transmission over broadband networks. For example, while access to voice communications remains mostly static (e.g., the location of a landline phone, and in many cases, a VOIP phone, generally does not change), access to the Internet is often dynamic, as evidenced by the increasing availability of Wi-Fi hotspots at airports, coffee shops, and the like. Among other things, these publicly accessible hotspots increase the difficulty of intercepting broadband communications and associating the intercepted traffic to specific users.

SUMMARY

Embodiments of the disclosure presented herein include methods, systems, and computer-readable media for analyzing data traffic captured by a lawful interception system. According to one aspect, a method for analyzing data traffic captured by a lawful interception system is provided. According to the method, a first record, one or more intermediate records, and a second record are received. The first record is created at a source computer. The first record includes a record of original test traffic generated at the source computer and transmitted from the source computer across a broadband network. The original test traffic includes an access to a website via a web browser. Each of the intermediate records includes a record of intercepted test traffic transmitted from a router to a mediation system or from the mediation system to a law enforcement agency system. The second record is created at the law enforcement agency system. The second record includes a record of the intercepted test traffic received at the law enforcement agency system from the second mediation system. A first version of the website is reassembled based on the first record. One or more intermediate versions of the website are reassembled based on the one or more intermediate records. A second version of the website is reassembled based on the second record. The first version of the website and at least one of the one or more intermediate versions of the website and the second version of the website are displayed for enabling a visual comparison between the first record and at least one of the one or more intermediate records and the second record.

According to another aspect, a system for analyzing data traffic captured by a lawful interception system is provided. The system includes a memory for storing a program containing code for analyzing data traffic captured by a lawful interception system, and a processor functionally coupled to the memory. The processor is responsive to computer-executable instructions contained in the program and operative to: receive a first record, receive one or more intermediate records, the second record being created at the law enforcement agency system, receive a second record, reassemble a first version of the website based on the first record, reassemble one or more intermediate versions of the website based on the one or more intermediate records, reassemble a second version of the website based on the second record, and display the first version of the website and at least one of the one or more intermediate versions of the website and the second version of the website for enabling a visual comparison between the first record and at least one of the one or more intermediate records and the second record. The first record is created at a source computer. The first record includes a record of original test traffic generated at the source computer and transmitted from the source computer across a broadband network. The original test traffic includes an access to a website via a web browser. Each of the intermediate records includes a record of intercepted test traffic transmitted from a router to a mediation system or from the mediation system to a law enforcement agency system. The second record is created at the law enforcement agency system. The second record includes a record of the intercepted test traffic received at the law enforcement agency system from the second mediation system.

According to yet another aspect, a computer-readable medium having instructions stored thereon for execution by a processor to perform a method for analyzing data traffic captured by a lawful interception system is provided. According to the method, a first record, one or more intermediate records, and a second record are received. The first record is created at a source computer. The first record includes a record of original test traffic generated at the source computer and transmitted from the source computer across a broadband network. The original test traffic includes an access to a website via a web browser. Each of the intermediate records includes a record of intercepted test traffic transmitted from a router to a mediation system or from the mediation system to a law enforcement agency system. The second record is created at the law enforcement agency system. The second record includes a record of the intercepted test traffic received at the law enforcement agency system from the second mediation system. A first version of the website is reassembled based on the first record. One or more intermediate versions of the website are reassembled based on the one or more intermediate records. A second version of the website is reassembled based on the second record. The first version of the website and at least one of the one or more intermediate versions of the website and the second version of the website are displayed for enabling a visual comparison between the first record and at least one of the one or more intermediate records and the second record.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for analyzing data traffic captured by a lawful interception system. In the following detailed description, references are made to the accompanying drawings that form a part hereof, and which are shown by way of illustration through specific embodiments or examples.

Lawfully intercepted data traffic between a monitored computer and the Internet can be a valuable source of evidence for law enforcement agencies. However, the intercepted data traffic is useful as legal evidence only when its accuracy can be verified. In particular, it is important under CALEA that the intercepted data traffic matches the original data traffic transmitted between the monitored computer and the Internet. Embodiments described herein provide for the analysis and verification of broadband data traffic for a lawful interception system.

The standard used for broadband CALEA intercepts is ATIS-1000013.2007s ("T1.IAS"). The T1.IAS standard is used to govern the content, format, and nature of information that is sent to a law enforcement agency during a court ordered intercept of broadband data traffic. The embodiments described herein are based on the T1.IAS standard, but other standards may be similarly utilized.

Consumer broadband access can be offered in a variety of ways. One type of broadband service that is commonly offered is digital subscriber line ("DSL"). Different service providers provide different ways to transport DSL products. For example, AT&T SOUTHWEST transports DSL products via three primary methods: (1) End User Access ("EUA"), which is based on a REDBACK SMS 1800 broadband remote access server ("BRAS"); (2) Enhanced End User Access ("EEUA"), which utilizes asynchronous transfer mode ("ATM") and is based on a NORTEL SERVICES EDGE ROUTER ("SER") 5500 BRAS; and (3) Competitive Broadband ("CBB"), which utilizes ATM or Ethernet transport and is based on a REDBACK SMARTEDGE ("SE") 800 BRAS. Although not so limited, the embodiments described herein refer primarily to CBB.

Figure 1:
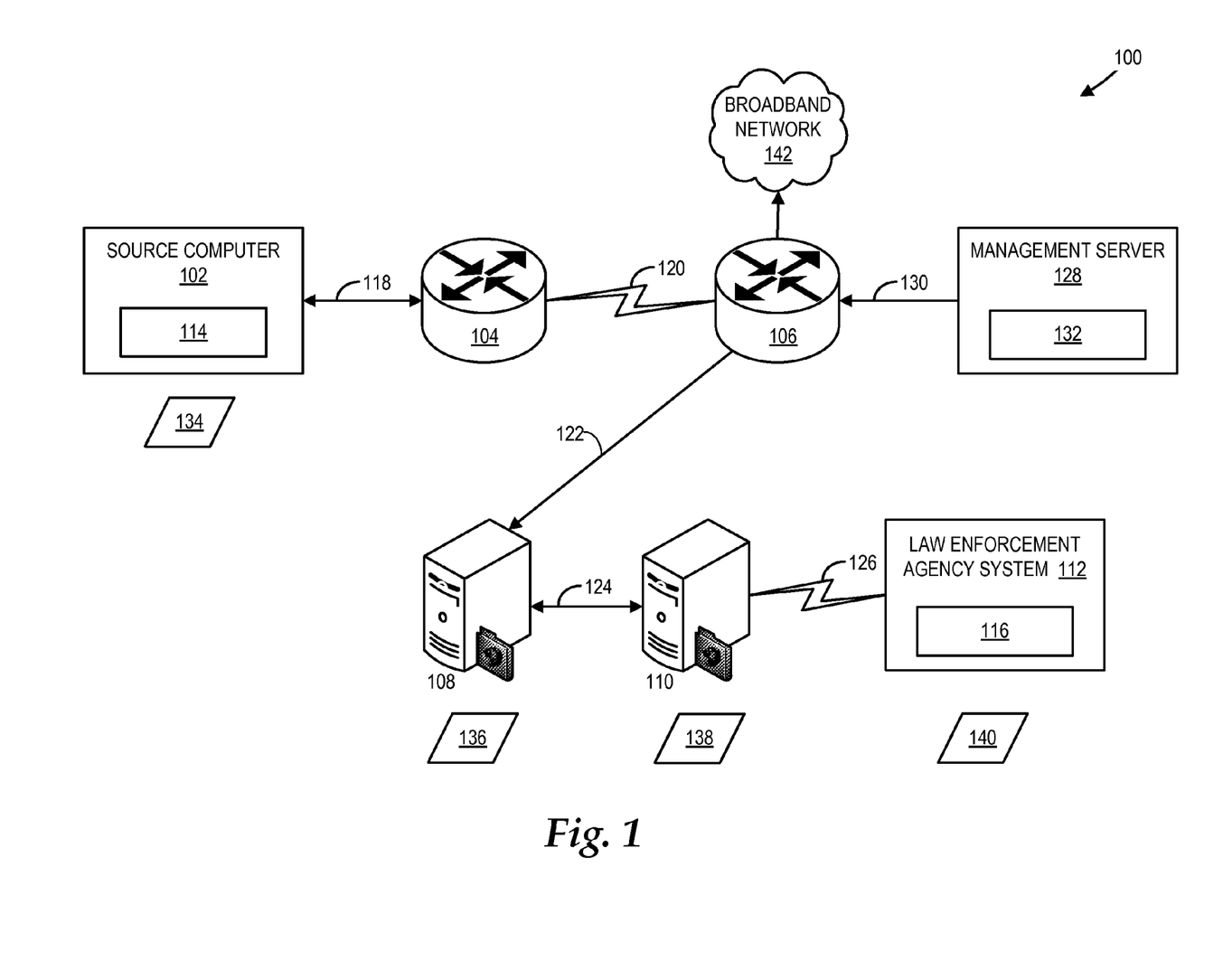
FIG. 1 is a simplified block diagram illustrating a testing system for generating test traffic and intercepting the test traffic, in accordance with exemplary embodiments.

Referring now to the drawings, it is to be understood that like numerals represent like elements through the several figures, and that not all components and/or steps described and illustrated with reference to the figures are required for all embodiments. FIG. 1 is a simplified block diagram showing an illustrative testing system 100 for generating test traffic and intercepting the test traffic, in accordance with exemplary embodiments. The testing system 100 may be utilized to capture known data traffic at a lawful interception system so that the intercepted data traffic may be analyzed to verify the accuracy of the lawful interception system.

The testing system 100 includes a source computer 102, which is operatively connected to a modem 104 via a first network link 118, such as a local area network ("LAN"). The modem 104 is operatively connected to a router 106 via a second network link 120, such as a production local loop. An example of the modem 104 may be an asymmetric digital subscriber line ("ADSL") Termination Unit Remote ("ATUR"), such as a CISCO 877 ATUR. An example of the router 106 may be a REDBACK SE 800. The router 106 is operatively connected to a first mediation system 108, such as the LAWFUL INTERCEPT NETWORK CONNECTOR ("LINC") from ETI CONNECT, via a third network link 122. The first mediation system 108 is operatively connected to a second mediation system 110 via a fourth network link 124, such as a LAN. The second mediation system 110 may also be the LINC from ETI CONNECT. The second mediation system 110 may be operatively connected to a law enforcement agency ("LEA") computer 112 (commonly referred to as the "collection function") via a fifth network link 126, such as a production local loop, a WAN link, and the like.

One way of operating two mediation systems, such as the first mediation system 108 and the second mediation system 110, is as follows. A first (ingress) mediation system may receive data traffic from intercepts, strip headers and other transport information (e.g., encapsulated user datagram protocol ("UDP") traffic from a REDBACK SE 800 BRAS, and then send the stripped data traffic to the second (egress) mediation system. The egress mediation system may receive the raw data traffic from the ingress, format the data traffic into Abstract Syntax Notation One ("ASN.1") notation, couple the data traffic with other identifying information, and then send the data traffic to the LEA computer 112. While the same may be implemented on one mediation system, implementing two or more mediation systems provides redundancy in case of failure of one of the systems, as well as a reduced lowed on the mediation systems.

According to exemplary embodiments, a management server 128, which is operatively connected to the router 106 via a sixth network link 130, executes a link director application 132 that configures the router 106 to automatically intercept data traffic (i.e., provision an intercept). In one embodiment, the link director application 132 configures the router 106 to intercept data traffic associated with a particular Remote Authentication Dial In User Service ("RADIUS") account username. For example, if law enforcement seeks to monitor the data traffic of a suspect with the RADIUS account username of "RBSE800S@bellsouth.net", the link director application 132 may configure the router 106 to intercept all data traffic associated with "RBSE800S@bellsouth.net". An example of the link director application 132 is the ETI CONNECT LINK DIRECTOR.

In an illustrative example, a known sequence of data traffic is generated at the source computer 102 and transmitted across a broadband network 142, such as the Internet, via the modem 104 and the router 106. As the data traffic exits the source computer 102, a sniffer program 114, such as WIRESHARK from GERALD COMBS, may be configured to maintain a first record 134 of all data packets transmitted from the source computer 102. This first record 134 is essentially a baseline (i.e., a gold standard) with which intercepted data traffic can be compared to determine the accuracy the intercepted data traffic.

The generated data traffic may be associated with a predefined RADIUS account username that the router 106 is configured to intercept. Upon intercepting the data traffic, the router 106 may transmit the intercepted data traffic via, for example, user datagram protocol ("UDP") to the first mediation system 108. The first mediation system 108 may forward the intercepted data traffic to the second mediation system 110. The second mediation system 110 may transmit the intercepted data traffic to the LEA computer 112. The LEA computer 112 may perform backend processing on the intercepted data traffic, via, for example, the PEN-LINK application from PEN-LINK, LTD.

In one embodiment, the first mediation system 108 maintains a second record 136 of all data packets entering the first mediation system 108 (i.e., at the ingress) from the router 106. Likewise, the second mediation system 110 maintains a third record 138 of all data packets exiting the second mediation system 110 (i.e., at the egress) to the LEA computer 112. The first mediation system 108 and the second mediation system 110 may maintain the second record 136 and the third record 138, respectively, utilizing, for example, TCPDUMP (i.e., TCPDUMP -s0 -I <interface> -w <FilenameSomething.pcap>), which is a well-known command provided in many UNIX-based operating systems. As illustrated in FIG. 1, the LEA computer 112 includes a sniffer program 116, such as WIRESHARK, configured to maintain a fourth record 140 of all data packets transmitted to the LEA computer 112.

According to exemplary embodiments, the first record 134, the second record 136, the third record 138, and the fourth record 140 are each stored as packet capture and flat file export ("PCAP") files. The second record 136, the third record 138, and the fourth record 140 may be compared against the first record 134 to determine the accuracy of the intercepted data traffic at various points on the testing system 100.

It should be appreciated that one or more services performing automated functions on the source computer 102 may be deactivated during testing to avoid intercepting extraneous data traffic. Examples of such services may include, but are not limited to, anti-virus software and operating system applets (e.g., MICROSOFT WINDOWS UPDATE, error reporting).

It should further be appreciated that one or more of source computer 102, the modem 104, the router 106, the first mediation system 108, the second mediation system 110, and/or the LEA computer 112 may be synchronized to a known time, such as network time protocol ("NTP") time. By synchronizing the components of the testing system 100 to a known time, the intercepted data traffic received at the LEA computer 112 may be accurately matched with the original data traffic originating from the source computer 102.

Figure 2:
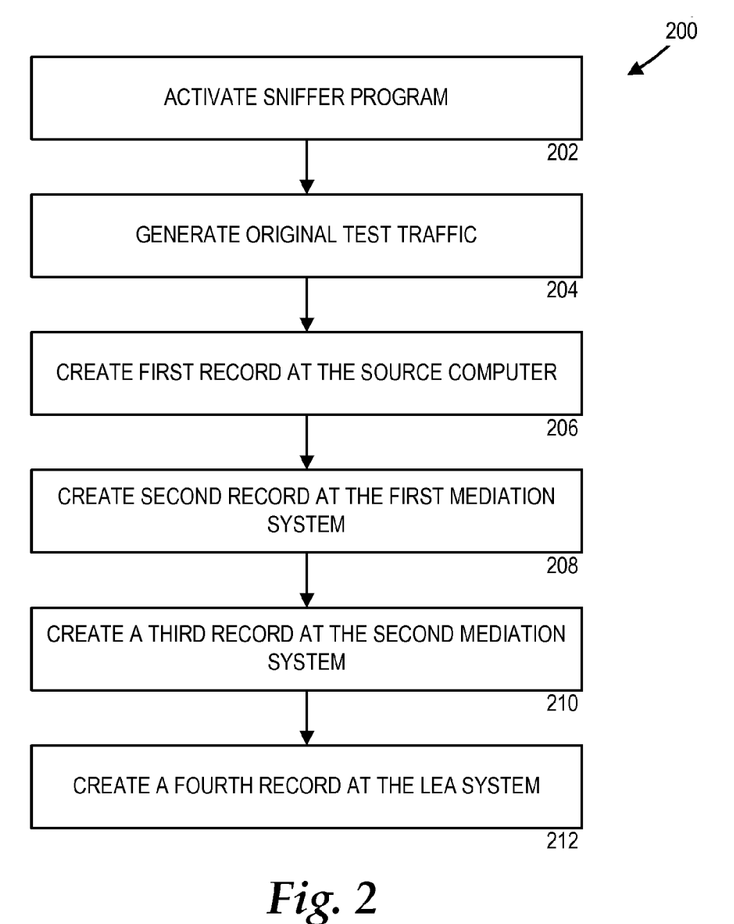
FIG. 2 is a flow diagram illustrating an illustrative test sequence implemented on the testing system of FIG. 1, in accordance with exemplary embodiments.
Figure 3:
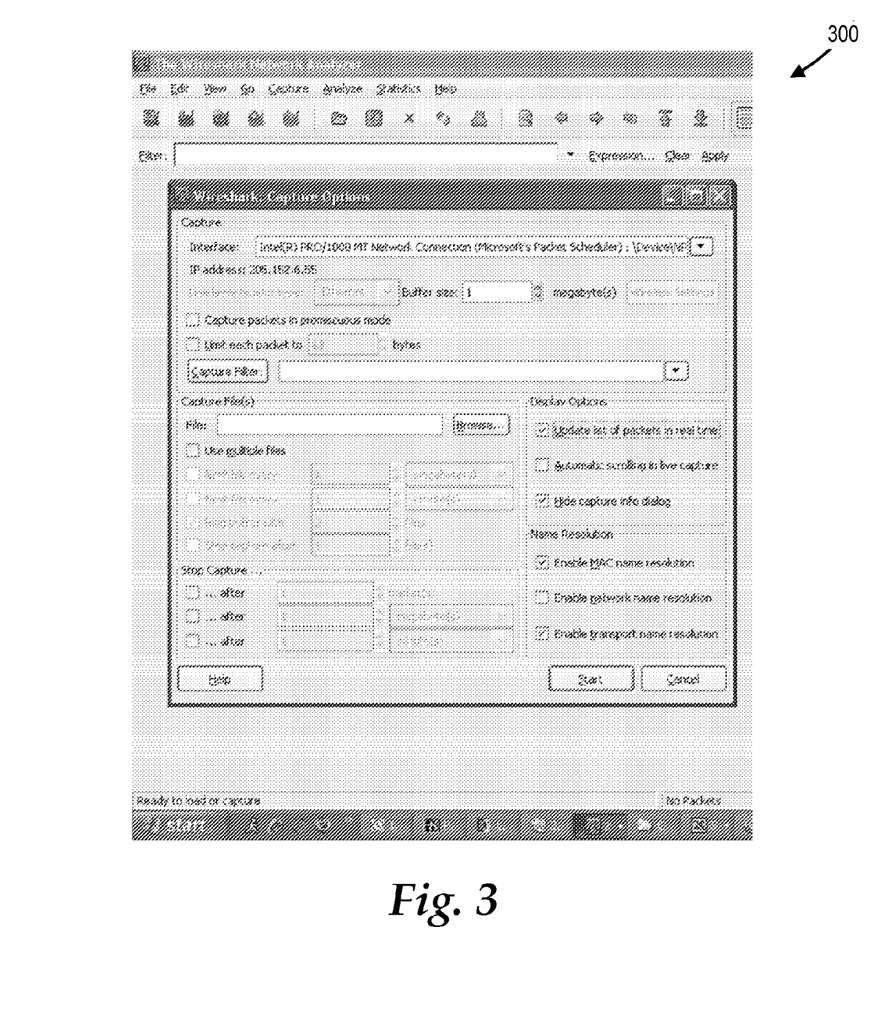
FIG. 3 is a screen display diagram illustrating a configuration of a sniffer program, in accordance with exemplary embodiments.

Referring now to FIG. 2, an illustrative data capture sequence 200 implemented on the testing system 100 will now be described. In a first operation of the data capture sequence 200, the sniffer programs 114, 116 are activated (at 202) on the source computer 102 and the LEA computer 112, respectively. In one embodiment, WIRESHARK is activated and configured to capture all data traffic in non-promiscuous mode. An exemplary configuration of WIRESHARK is shown in an illustrative screenshot 300 illustrated in FIG. 3.

Referring again to FIG. 2, upon activating the sniffer programs 114, 116, the original test traffic is generated (at 204) at the source computer 102 in a predefined sequence. In an illustrative example, the following sequence of original test traffic is generated in a command line interface provided by an operating system executed at the source computer 102: (1) "ping -n 5 205.152.37.193"; (2) "telnet route-views.route-views.org"; (3) "nslookup www.amazon.com". The commands "ping", "telnet", and "nslookup" are well-known and commonly found in many UNIX-based operating systems. Following the command line operations, the website "www.fiveguys.com" is accessed via a web browser. Once the website is visited, the web browser may be terminated.

Figure 4:
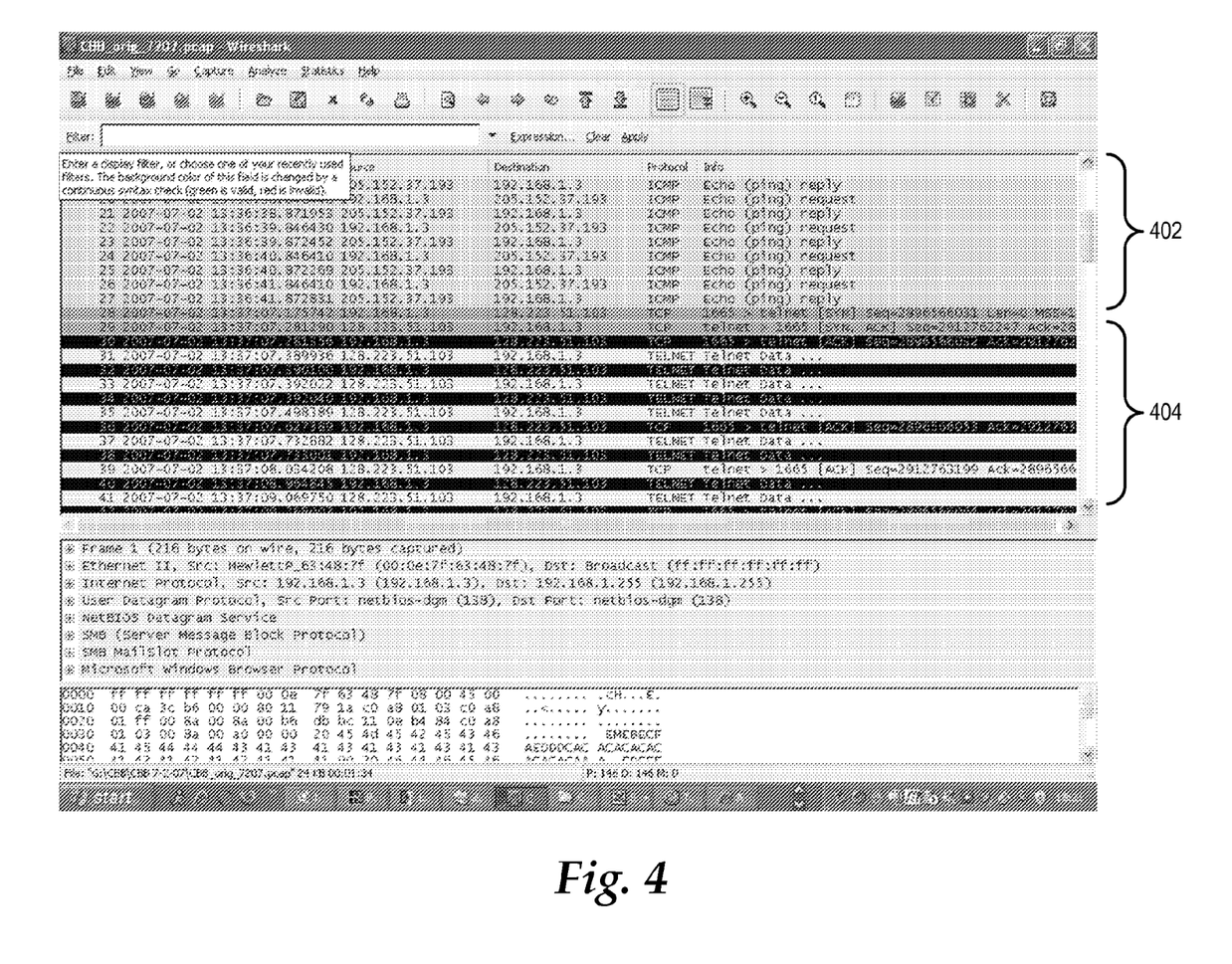
FIG. 4 is a screen display diagram illustrating a capture by the sniffer program, in accordance with exemplary embodiments.

According to exemplary embodiments, the sniffer program 114 records the original test traffic originating at the source computer 102. The first record 134 is created (at 206) based on the original test traffic recorded at the source computer 102. An exemplary WIRESHARK capture is shown in an illustrative screenshot 400 illustrated in FIG. 4. A first section 402 of the screenshot 400 shows information on data packets related to the ping request. A second section 404 of the screenshot 400 shows information on data packets related to the telnet command.

As the original test traffic reaches the router 106, the router 106 may intercept the original test traffic originating from the source computer 102. In one embodiment, the router 106 is configured to intercept the test traffic based on an associated RADIUS account username. The router 106 may transmit the intercepted test traffic to the first mediation system 108. As the intercepted test traffic enters the first mediation system 108, the first mediation system 108 may record the incoming intercepted test traffic using, for example, TCPDUMP. The second record 136 is created (at 208) based on the intercepted test traffic entering the first mediation system 108.

The first mediation system 108 may forward the intercepted test traffic to the second mediation system 110, which transmits the intercepted test traffic to the LEA computer 112. As the intercepted test traffic exits the second mediation system 110, the second mediation system 110 may record the outgoing intercepted test traffic using, for example, TCPDUMP. The third record 138 is created (at 210) based on the intercepted test traffic exiting the second mediation system 110. The sniffer program 116 may record the intercepted test traffic received at the LEA computer 112. The fourth record 140 is created (at 212) based on the intercepted test traffic received at the LEA computer 112.

In one embodiment, post-processing is performed on one or more of the first record 134, the second record 136, the third record 138, and/or the fourth record 140 prior to data analysis in order to prepare the first record 134, the second record 136, the third record 138, and the fourth record 140 for data analysis. A variety of different post-processing techniques may be performed as contemplated by those skilled in the art. In one example of post-processing, the data packets listed in the first record 134, the second record 136, the third record 138, and the fourth record 140 may be sorted by sequence number and session. Another example of post-processing may include stripping Internet Protocol ("IP"), UDP, and Packet Cable headers as well as Abstract Syntax Notation One ("ASN.1") formatting, thereby leaving only original data traffic. Yet another example of post-processing may include the creation of a file containing Message-Digest algorithm 5 ("MD5") checksums for each data packet listed.

According to exemplary embodiments, the second record 136, the third record 138, and the fourth record 140 are evaluated against the first record 134 to verify the accuracy of the intercepted test traffic with respect to the original test traffic. One way to compare data packets between the first record 134, the second record 136, the third record 138, and the fourth record 140 is by comparing a MD5 checksum calculation for each data packet. For example, the presence of an additional data packet or a missing data packet in the second record 136, the third record 138, or the fourth record 140 that is not in the first record 134 may indicate an issue with at least a portion of the testing system 100.

Another way to evaluate the accuracy of the data capture is to reassemble the data packets associated with a website visit. In the previous example, the website "www.fiveguys.com" was included in the test traffic. By reconstructing the data packets associated with the visit to "www.fiveguys.com" in each of the first record 134, the second record 136, the third record 138, and the fourth record 140, a visual comparison or other evaluation can be made. Differences in the four reconstructions may indicate an issue with at least a portion of the testing system 100.

Additional analysis can be performed to determine the relative time with which the first mediation system 108, the second mediation system 110, and the LEA computer 112 receive the intercepted data traffic. In particular, some law enforcement agencies require that data traffic be intercepted and/or transported within certain time limits from the source computer 102 to the LEA computer 112, and at various points in between. Thus, it is generally desirable that embodiments measure not only the accuracy of the intercepted test traffic, but also the timeliness in which the original test traffic is intercepted and transported.

Figure 5:
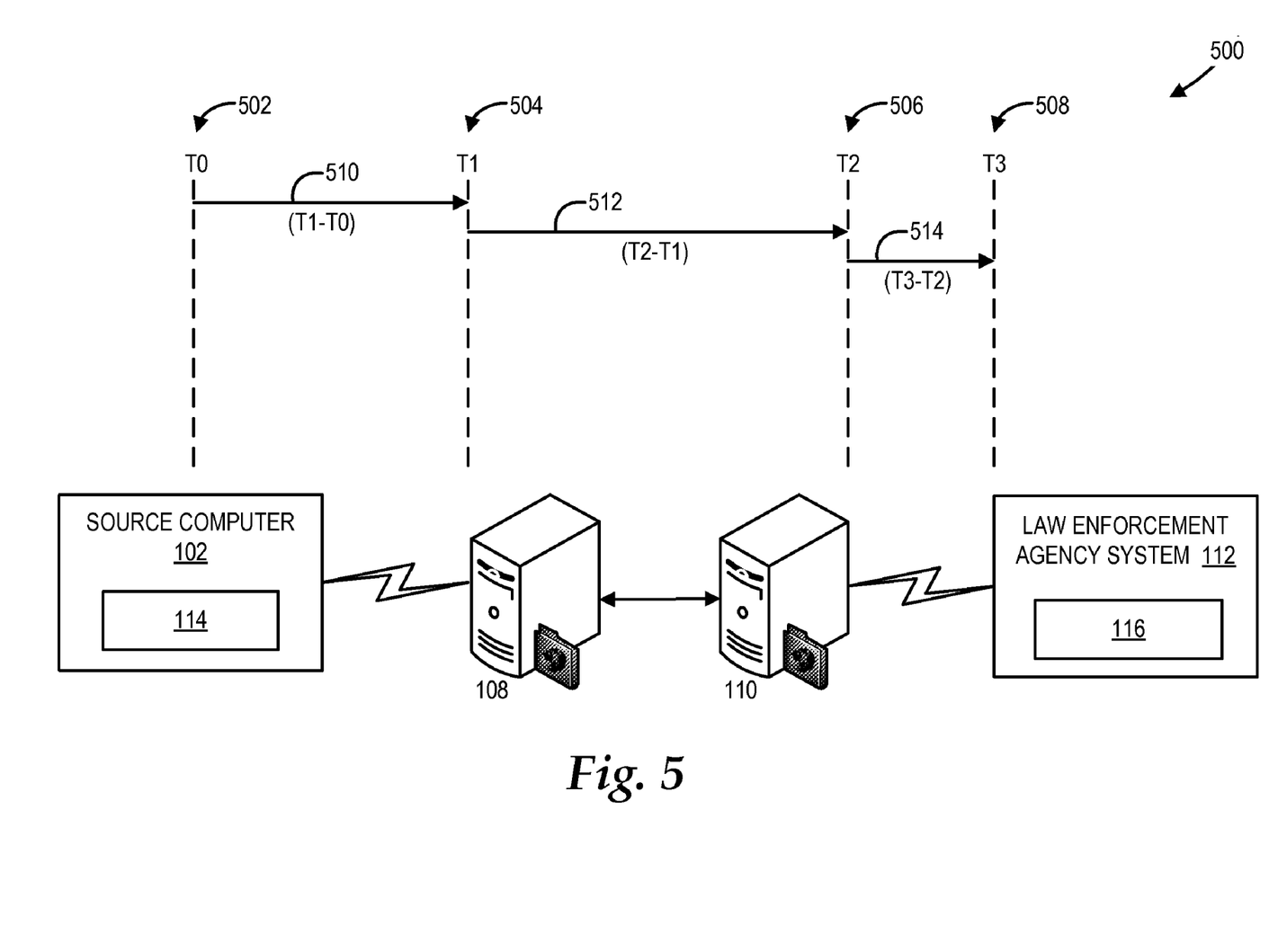
FIG. 5 is a simplified block diagram illustrating a partial view of the testing system of FIG. 1 in relation to measuring the timeliness in which data traffic is intercepted and transported, in accordance with exemplary embodiments.

Referring now to FIG. 5, a testing system 500, which is a simplified version of the illustrative testing system 100, is shown, in accordance with exemplary embodiments. While the testing system 100 illustrated in FIG. 1 is directed to an embodiment for creating the first record 134, the second record 136, the third record 138, and the fourth record 140, the testing system 500 illustrated in FIG. 5 better illustrates an embodiment for measuring the timeliness for intercepting and transporting the original test traffic. The testing system 500 includes the source computer 102, the first mediation system 108, the second mediation system 110, and the LEA computer 112.

The testing system 500 includes four time values: a first time value ("T0") 502, a second time value ("T1") 504, a third time value ("T2") 506, and a fourth time value ("T3") 508. The first time value 502 represents a time at which test traffic is generated at the source computer 102. The second time value 504 represents a time at which test traffic is intercepted at the router 106, and transmitted from the router 106 to the ingress of the first mediation system 108. The third time value 506 represents a time at which the intercepted test traffic is transmitted from the egress of the second mediation system 110 to the LEA computer 112. The fourth time value 508 represents a time at which the intercepted test traffic is received by the LEA computer 112.

Relevant time intervals include a first time interval 510, a second time interval 512, and a third time interval 514. The first time interval 510 represents the difference between the second time value 504 and the first time value 502. The second time interval 512 represents the difference between the third time value 506 and the second time value 504. The third time interval 514 represents the difference between the fourth time value 508 and the third time value 506. Other time intervals may be relevant as contemplated by those skilled in the art.

In an example, the T1.IAS standard requires that the first time interval 510 be within 200 milliseconds ("ms"). The T1.IAS standard requires the sum of the first time interval 510 and second time interval 512 to be within eight seconds. The T1.IAS standard does not specify a time requirement for the sum of the first time interval 510, the second time interval 512, and the third time interval 514. However, VOIP call quality may be adversely affected if the third time interval 514 is greater than 150 ms.

Figure 6:
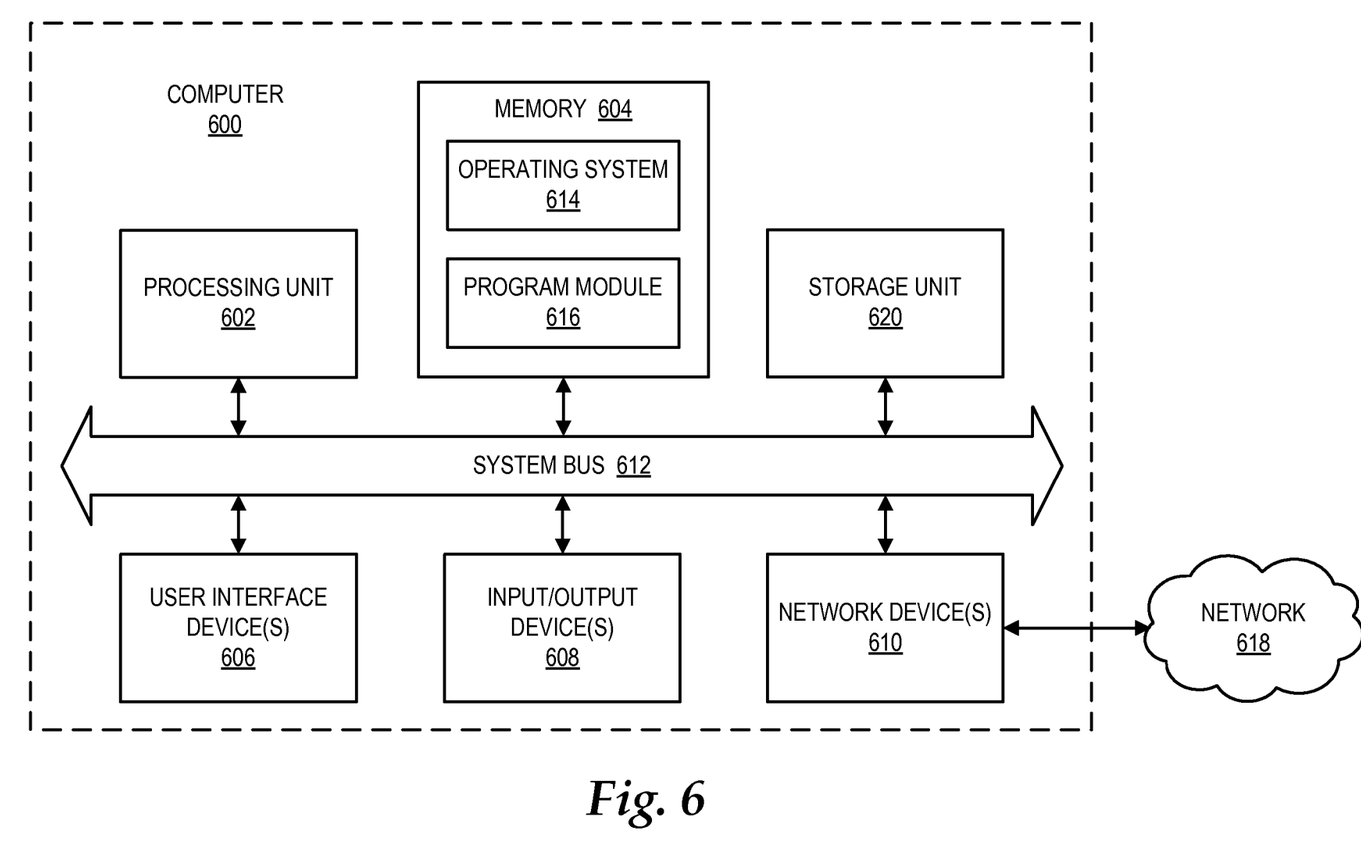
FIG. 6 is a computer architecture diagram showing aspects of an illustrative computer hardware architecture for a computing system capable of implementing aspects of the embodiments presented herein.

FIG. 6 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 6 is a block diagram illustrating a computer 600, in accordance with exemplary embodiments. Examples of the computer 600 may include the source computer 102, the first mediation system 108, the second mediation system 110, the LEA computer 112, and the management server 128. The computer 600 includes a processing unit 602, a memory 604, one or more user interface devices 606, one or more input/output ("I/O") devices 608, one or more network devices 610, and the storage unit 620, each of which is operatively connected to a system bus 612. The bus 612 enables bi-directional communication between the processing unit 602, the memory 604, the user interface devices 606, the I/O devices 608, the network devices 610, and the storage unit 620.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 614 and at least one program module 616, according to exemplary embodiments. Examples of operating systems, such as the operating system 614, include, but are not limited to, WINDOWS operating system from MICROSOFT CORPORATION, LINUX operating system, MAC OS from APPLE CORPORATION, and FREEBSD operating system. Examples of the program module 616 include the sniffer programs 114, 116 and the link director application 132. In one embodiment, the program module 616 is embodied in computer-readable media containing instructions that, when executed by the processing unit 602, performs at least a portion of the data capture sequence 200, as described in greater detail with respect to FIG. 2. According to further embodiments, the program module 616 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 600.

The user interface devices 606 may include one or more devices with which a user accesses the computer 600. The user interface devices 606 may include, but are not limited to, computers, servers, personal digital assistants, cellular phones, or any suitable computing devices. The I/O devices 608 enable a user to interface with the program module 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer 600 to communicate with other networks or remote systems via a network 618. Examples of the network devices 610 may include, but are not limited to, a modem (e.g., an ATUR), a radio frequency ("RF") or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). An example of the network 618 is the network 142.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for analyzing data traffic captured by a lawful interception system, comprising:
   receiving a first record, the first record being created at a source computer, the first record comprising a record of test traffic generated at the source computer and transmitted from the source computer across a broadband network, the test traffic comprising an access to a website via a web browser;
   receiving at least one intermediate record, the at least one intermediate record comprising a record of the test traffic intercepted while being transmitted between a router and a plurality of mediation systems;
   receiving a second record, the second record being created at a law enforcement agency system, the second record comprising a record of the test traffic when received at the law enforcement agency system from the mediation systems;
   constructing a first version of the website by reassembling first website data contained on the first record into one or more first web pages;
   constructing at least one intermediate version of the website based by reassemble intermediate website data contained on the at least one intermediate record into one or more intermediate web pages;
   constructing a second version of the website by reassembling second website data contained on the second record into one or more second web pages; and
   displaying the one or more first web pages in the first version of the website, the one or more intermediate web pages in the at least one intermediate version of the website, and the one or more second web pages in the second version of the website for enabling a visual comparison between the first record, and the at least one intermediate record, and the second record.

2. The method of claim 1, further comprising:
   determining a first time at which the test traffic is generated at the source computer;
   determining a plurality of intermediate times at which the test traffic is received at the mediation systems;
   determining a second time at which the test traffic is received at the law enforcement agency system;
   comparing a difference between the first time and the intermediate times with a first time requirement to determine whether the test traffic is timely received; and
   comparing a difference between the intermediate times with a second time requirement to determine whether intercepted test traffic is timely received.

3. The method of claim 1, wherein the test traffic is generated at the source computer by executing a predefined sequence of commands in a predefined order.

4. The method of claim 1, wherein the first record, the at least one intermediate record, and the second record each comprise a packet capture (PCAP) file.

5. The method of claim 1, wherein the router intercepts the test traffic, the router identifying the test traffic based on a given Remote Authentication Dial In User Service (RA- DIUS) account username; and wherein the router forwards the intercepted test traffic to the mediation systems via user datagram protocol (UDP).

6. The method of claim 1, wherein the first record is created via a sniffer program executed at the source computer, wherein the at least one intermediate record is created via a TCPDUMP command executed at the mediation systems, and wherein the second record is created via the sniffer program executed at the law enforcement agency system.

7. A system for analyzing data traffic captured by a lawful interception system, comprising:
   a memory for storing a program containing code for analyzing data traffic captured by the lawful interception system;
   a processor functionally coupled to the memory, the processor being responsive to computer-executable instructions contained in the program and operative to:
      receive a first record, the first record being created at a source computer, the first record comprising a record of test traffic generated at the source computer and transmitted from the source computer across a broadband network, the test traffic comprising an access to a website via a web browser,
      receive at least one intermediate record, the at least one intermediate record comprising a record of the test traffic intercepted while being transmitted between a router and a plurality of mediation systems,
      receive a second record, the second record being created at a law enforcement agency system, the second record comprising a record of the test traffic when received at the law enforcement agency system from the mediation systems,
      construct a first version of the website by reassembling first website data contained on the first record into one or more first web pages,
      construct at least one intermediate version of the website by reassembling intermediate website data contained on the at least one intermediate record into one or more intermediate web pages,
      construct a second version of the website by reassembling second website data contained on the second record into one or more second web pages, and
      display the one or more first web pages in the first version of the website, the one or more intermediate web pages in the at least one intermediate version of the website, and the one or more second web pages in the second version of the website for enabling a visual comparison between the first record, the at least one intermediate record, and the second record.

8. The system of claim 7, wherein the test traffic is generated at the source computer by executing a predefined sequence of commands in a predefined order.

9. The system of claim 7, wherein the first record, the at least one intermediate record, and the second record each comprise a packet capture (PCAP) file.

10. The system of claim 7, wherein the router identifies the test traffic based on a given Remote Authentication Dial In User Service (RADIUS) account username; and wherein the router forwards the intercepted test traffic to the mediation systems via user datagram protocol (UDP).

11. The system of claim 7, wherein the first record is created via a sniffer program executed at the source computer, wherein the at least one intermediate record is created via a TCPDUMP command executed at the mediation systems, and wherein the second record is created via the sniffer program executed at the law enforcement agency system.

12. A non-transitory computer-readable medium having instructions stored thereon for execution by a processor to provide a method for analyzing data traffic captured by a lawful interception system, the method comprising:
   receiving a first record, the first record being created at a source computer, the first record comprising a record of test traffic generated at the source computer and transmitted from the source computer across a broadband network, the test traffic comprising an access to a website via a web browser;
   receiving at least one intermediate record, the at least one intermediate record comprising a record of the test traffic intercepted while being transmitted between a router and a plurality of mediation systems;
   receiving a second record, the second record being created at the law enforcement agency system, the second record comprising a record of the test traffic when received at the law enforcement agency system from the mediation systems;
   constructing a first version of the website by reassembling first website data contained on the first record into one or more first web pages;
   constructing at least one intermediate version of the website by reassembling intermediate website data contained on the at least one intermediate record into one or more intermediate web pages;
   constructing a second version of the website by reassembling second website data contained on the second record into one or more second web pages; and
   displaying the one or more first web pages in the first version of the website, the one or more intermediate web pages in the at least one intermediate version of the website, and the one or more second web pages in the second version of the website for enabling a visual comparison between the first record, at least one intermediate record, and the second record.

13. The non-transitory computer-readable medium of claim 12, wherein the test traffic is generated at the source computer by executing a predefined sequence of commands in a predefined order.

14. The non-transitory computer-readable medium of claim 12, wherein the first record, the at least one intermediate record, and the second record each comprise a packet capture (PCAP) file.

15. The non-transitory computer-readable medium of claim 12, wherein the router intercepts the test traffic, the router identifying the test traffic based on a given Remote Authentication Dial In User Service (RADIUS) account username; and wherein the router forwards the intercepted test traffic to the mediation systems via user datagram protocol (UDP).

16. The non-transitory computer-readable medium of claim 12, wherein the first record is created via a sniffer program executed at the source computer, wherein the at least one intermediate record is created via a TCPDUMP command executed at the mediation systems, and wherein the second record is created via the sniffer program executed at the law enforcement agency system.

* * * * *